United States Patent [19]

Tabarovsky et al.

[11] Patent Number: 5,703,773
[45] Date of Patent: Dec. 30, 1997

[54] REAL-TIME 2-DIMENSIONAL INVERSION PROCESS AND ITS APPLICATION TO INDUCTION RESISTIVITY WELL LOGGING

[75] Inventors: Leonty Abraham Tabarovsky; Michael Boris Rabinovich, both of Houston, Tex.

[73] Assignee: Western Atlas International, Inc., Houston, Tex.

[21] Appl. No.: 598,443

[22] Filed: Feb. 8, 1996

[51] Int. Cl.$^6$ .................................................. G06F 19/00
[52] U.S. Cl. ........................................................ 364/422
[58] Field of Search ........................................ 364/422, 421; 324/339, 340, 341, 342, 343, 355, 356

[56] References Cited

U.S. PATENT DOCUMENTS 4,314,339 2/1982 Kenyon .................................. 364/422
5,461,562 10/1995 Tabanou et al. ...................... 364/422

OTHER PUBLICATIONS

Grove, G.P., Minerbo, G.N. An Adaptive Borehole Correction Scheme for Array Induction Tools, SPWLA 32nd Annual Logging Symposium, Jun. 16–19, 1991.

Eaton, Perry A. 3D Electromagnetic Inversion Using Integral Equations, Geophysical Prospecting 37, 407–426, 1989.

Lines, L.R., Treitel, S. A Review of Least–Squares Inversion and Its Application to Geophysical Problems, Geophysical Prospecting 32, 159–186, 1984.

Primary Examiner—Donald E. McElheny, Jr.
Attorney, Agent, or Firm—Richard A. Fagin

[57] ABSTRACT

The invention is a method of inversion processing signals from an induction well logging instrument including a transmitter and a plurality of receivers at spaced apart locations. The method includes skin effect correcting the responses of the receivers by extrapolating the receiver responses to zero frequency. A model is generated of the media surrounding said instrument. Conductivities of elements in the model are then adjusted so that a measure of misfit between the skin-effect corrected receiver responses and simulated receiver responses based on the model is minimized. The geometry of the model is then adjusted so that the measure of misfit between the skin-effect corrected receiver responses and the simulated receiver responses based on the model is further minimized. In a preferred embodiment of the invention, the step of adjusting the geometry includes minimizing the measure of misfit between the simulated responses and the receiver responses from selected ones of the receivers closely spaced to the transmitter. Numbers of and positions of radial boundaries are then determined by minimizing the measure of misfit for all the receiver responses.

37 Claims, 8 Drawing Sheets

| MUD RESISTIVITY = 0.1 Ohm-m, BOREHOLE RADIUS = 15 cm. | | | | |
|---|---|---|---|---|
| LAYER # | LAYER THICKNESS (FEET) | INVASION ZONE PARAMETERS | | FORMATION RESISTIVITY (Ohm_m) |
| | | OUTER RADIUS (cm) | RESISTIVITY (Ohm_m) | |
| 1 | INFINITE | – | – | 2 |
| 2 | 10 | 65.8 | 5 | 20 |
| 3 | 10 | – | – | 2 |
| 4 | 9 | 65.8 | 5 | 20 |
| 5 | 9 | – | – | 2 |
| 6 | 8 | 65.8 | 5 | 20 |
| 7 | 8 | – | – | 2 |
| 8 | 7 | 65.8 | 5 | 20 |
| 9 | 7 | – | – | 2 |
| 10 | 6 | 65.8 | 5 | 20 |
| 11 | 6 | – | – | 2 |
| 12 | 5 | 65.8 | 5 | 20 |
| 13 | 5 | – | – | 2 |
| 14 | 4 | 65.8 | 5 | 20 |
| 15 | 4 | – | – | 2 |
| 16 | 3 | 65.8 | 5 | 20 |
| 17 | 3 | – | – | 2 |
| 18 | 2 | 65.8 | 5 | 20 |
| 19 | 2 | – | – | 2 |
| 20 | 1 | 65.8 | 5 | 20 |
| 21 | INFINIT | – | – | 2 |

REAL-TIME 2-DIMENSIONAL INVERSION PROCESS AND ITS APPLICATION TO INDUCTION RESISTIVITY WELL LOGGING

BACKGROUND OF THE INVENTION

1. Field of the Invention

The present invention relates generally to the field of electrical logging of oil wells. More specifically, the present invention relates to methods of processing measurements made by induction resistivity well logging instruments in order to improve the resolution, speed and accuracy of the data interpretation.

2. Description of the Related Art

Induction resistivity well logging devices are known in the art for measuring the electrical resistivity of earth formations penetrated by wellbores. Electrical resistivity measurements are used for, among other things, to infer the fluid content of pore spaces of the earth formations.

Induction electrical resistivity instruments known in the art, such as one described in Hunka, J. "A New Resistivity Measurement System for Deep Formation Imaging and High Resolution Formation Evaluation", paper no. 20559, Society of Petroleum Engineers, Richardson, Tex., 1990, typically measure voltages induced in receiver coils positioned at spaced apart locations along the instrument. The voltages are induced by magnetic fields generated by eddy currents flowing in the earth formations around the instrument, in response to alternating currents of various frequencies being passed through a transmitter coil. The voltages induced in a particular one of the receiver coils are dependent on the electrical conductivity (which is inversely related to resistivity) of the media, including the earth formations, surrounding the instrument, and are dependent on the spacing of the particular receiver coil with respect to the transmitter coil. Generally, the greater the spacing between the transmitter coil and the particular receiver coil, the greater is the radial depth from the wellbore into the earth formation from which the measurement at that receiver coil corresponds. The vertical resolution of the measurements made by the closer-spaced receiver coils, however, is proportionately finer than is the vertical resolution of the measurements made by the more distant receiver coils.

Fine vertical resolution of the measurements of electrical resistivity of the earth formations is important because the vertical thickness of some of the earth formations is very small. If the vertical resolution of a particular receiver coil measurement exceeds the thickness of a particular earth formation, the correspondence of that particular measurement to the resistivity of that earth formation can likewise be reduced.

When the wellbore is drilled, fluids from the drilling process may be forced into the pore spaces of some of the earth formations, changing their fluid content and therefore their resistivity. The process of fluid being forced into the pore spaces is generally referred to as "invasion". Wellbore can be drilled with fluids having differing electrical resistivities, and the wellbore itself can have widely varying diameters over its length. The effects of variable wellbore diameter and differing wellbore fluid resistivity can indeterminately affect the total voltage being induced in each one of the receiver coils, because eddy currents also can flow within the conductive wellbore fluid and within that portion of the earth formations surrounding the wellbore subject to the invasion (the so-called "invaded zone").

The voltages induced in the receiver coils more closely spaced to the transmitter coil are subject to larger effects from the wellbore and invaded zone. The voltages induced in the receiver coils more distant from the transmitter coil are less subject to the effects of the wellbore and invasion, but the voltages induced in the more distant receiver coils, as previously explained, typically have inferior vertical resolution when compared to those voltages induced in the more closely-spaced receiver coils.

Resistivity well log data processing known in the art has an objective of determining the resistivity of the earth formation in the zone not subject to invasion, generally by using at least pan of the response of the more distant receiver coils, while substantially maintaining the effective vertical resolution of the more closely spaced receiver coils. One type of resistivity data processing known in the art is called inversion. One type of inversion is described, for example in L. R. Lines and S. Treitel, "Tutorial: A Review of Least-Squares Inversion and Its Application to Geophysical Problems", Geophysical Prospecting, Vol. 32, pp 159–186, 1984. Inversion processing typically includes generating an initial "guess", or model, of the parameters of the earth formations surrounding the instrument. The parameters usually include vertical (more typically coaxial with the instrument) thicknesses of the earth formations, the electrical conductivities (resistivities) of the earth formations and the position of the radial boundary and the conductivity on either side of the boundary of any particular earth formation having an invaded zone. The initial model is used typically to calculate simulated responses for the individual receiver coils in the instrument. The simulated responses are compared with the actual receiver coil measurements made by the instrument over the same axial interval of the wellbore. Differences between the simulated response and the measured response are used to adjust the parameters of the model. The simulation calculation and comparison steps are repeated until the differences between the simulated responses and the measured responses fall below a predetermined threshold. The model which generates simulated responses having a difference between the measured instrument response which falls below the threshold is determined to include the most likely set of earth formation parameters.

A drawback to the inversion techniques known in the art is that they are time consuming to perform. One reason for the time consuming nature of the inversion methods known in the art is that they can require prior knowledge of the number of modelling elements to construct the initial model. If the number of modelling elements needs to be changed to reflect the actual nature of the earth formations, then the inversion typically must be recalculated in its entirely. Another reason for the slow processing of the inversion models known in the art is that they can require an excessive number of modelling elements to accurately represent the earth formations which have been measured.

Using the inversion methods known in the art it is typically impossible to calculate a model which best approximates the measured instrument response while the instrument is still in the process of making measurements at commercially acceptable speeds. In certain circumstances it can be advantageous to the wellbore operator to be able to determine the formation parameters while the instrument is still making measurements.

A modelling calculation process is known in the art which can operate at speeds comparable to commercially acceptable speeds of movement of the induction logging instrument. Such an inversion process is described, for example in, A. Q. Howard, Jr., "A New Invasion Model for Resistivity Log Interpretation", The Log Analyst, pp 96–110, March–April, 1992, Society of Professional Well Log Analysts, Houston, Tex. A drawback to the inversion process in the Howard reference is that it is 1-dimensional, determining only the positions of and the resistivities on either side of radial boundaries of the invaded zones. The process described in the Howard reference does not provide for any optimization of the position of and number of axial elements, such as bed boundaries within the earth formations.

It is therefore an object of the present invention to provide a method of 2-dimensional inversion processing for data from an induction well logging instrument which can be calculated while the instrument is making measurements at commercially acceptable speeds and without significant time delay from the making of the measurements to the delivery of the calculated formation parameters.

SUMMARY OF THE INVENTION

The present invention is a method of inversion processing signals from an induction well logging instrument. The instrument includes a transmitter and a plurality of receivers at axially spaced apart locations. The method includes skin effect correcting the responses of the receivers by extrapolating the receiver responses to zero frequency. A model is generated of the media surrounding said instrument. Conductivities of elements in the model are adjusted so that a measure of misfit between the skin-effect corrected receiver responses and simulated receiver responses based on the model is minimized. The geometry of the model is adjusted so that the measure of misfit between the skin-effect corrected receiver responses and the simulated receiver responses based on the model is further minimized.

In a preferred embodiment of the invention, the step of adjusting the geometry of the model includes minimizing the measure of misfit between the simulated responses and the receiver responses from selected ones of the receivers closely spaced to the transmitter. Numbers of and positions of radial boundaries are then determined by minimizing the measure of misfit for all the receiver responses.

DESCRIPTION OF THE PREFERRED EMBODIMENT

Figure 1:
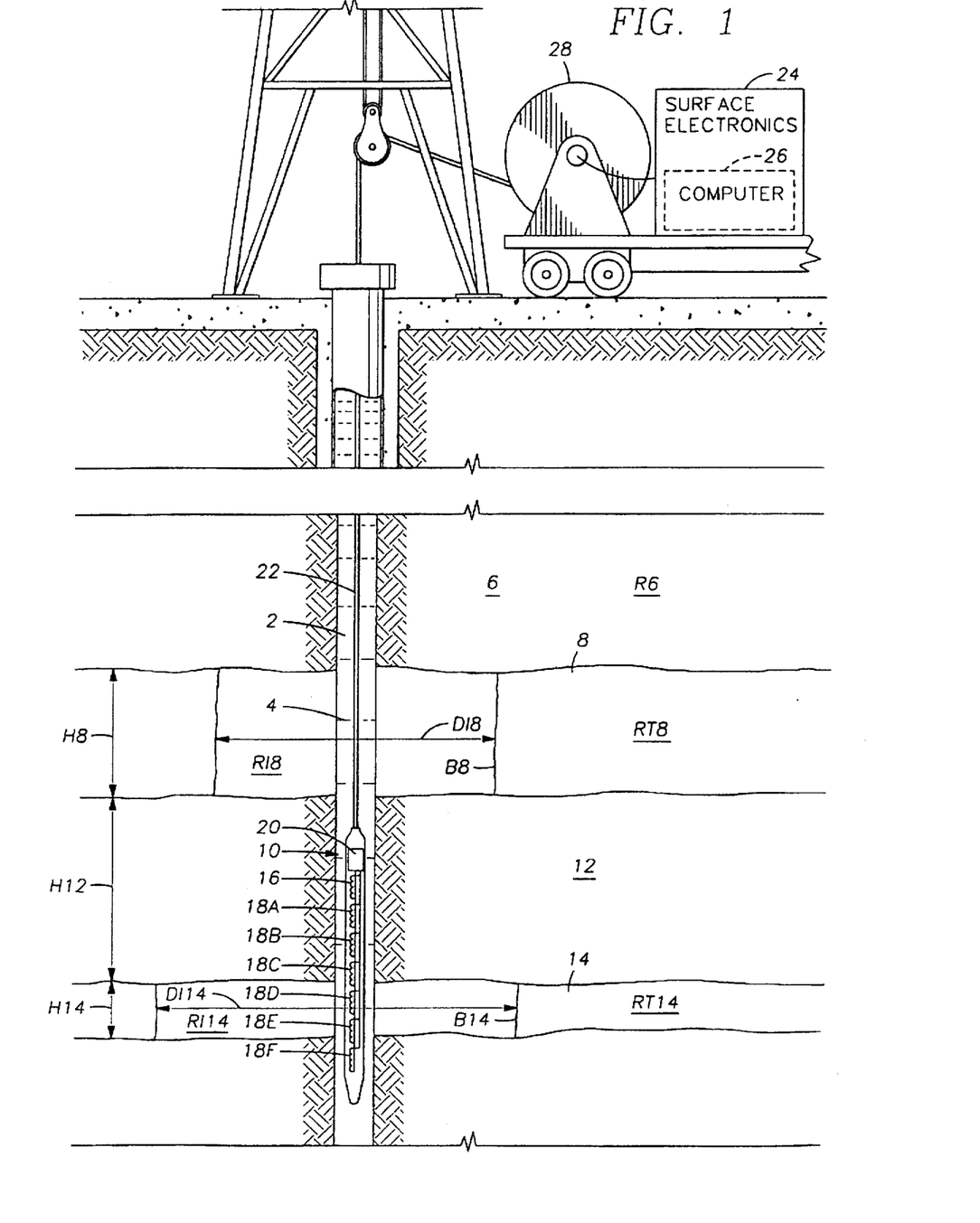
FIG. 1 shows an induction well logging tool having an array of receiver coils disposed in a wellbore penetrating various earth formations.

FIG. 1 shows an induction well logging instrument 10 disposed in a wellbore 2 penetrating earth formations, the formations shown generally at 6, 8, 12 and 14. The instrument 10 is typically lowered into the wellbore 2 at one end of an armored electrical cable 22 by means of a winch 28 or similar device known in the art. An instrument which will generate appropriate induction signals for performing the process of the present invention is described, for example, in U.S. Pat. No. 5,452,761 issued to Beard et al. The instrument described in the Beard et al '761 patent is not an exclusive representation of well logging instruments which can generate signals for performing the process of the present invention and therefore is not meant as a limitation on the present invention.

The instrument 10 can include a telemetry/signal processing unit 20 (SPU). The SPU 20 can include a source of alternating current (not shown separately) to be conducted through a transmitter coil 16 disposed on the instrument 10. Receiver coils 18A–18F can be disposed at axially spaced apart locations along the instrument 10. The SPU 20 can include receiver circuits (not shown separately) connected to the receiver coils 18A–18F for detecting voltages induced in each of the receiver coils 18A–18F. The SPU 20 can also impart signals to the cable 22 corresponding to the magnitude of the voltages induced in each of the receiver coils 18A–18F. It is to be understood that the number of receiver coils and the arrangement of the coils shown in the instrument in FIG. 1 is not meant to be a limitation on the present invention. It is to be further understood that the receiver coils shown in FIG. 1 can either be single coils or a type of coil known in the art as "mutually balanced" wherein a second coil (not shown) is series connected in inverse polarity to the primary coil (not shown in FIG. 1) so as to reduce the effect of direct induction from the transmitter coil 16.

As is understood by those skilled in the art, the alternating current passing through the transmitter coil 16 induces eddy currents in the earth formations 6, 8, 12, 14. The eddy currents correspond in magnitude to the electrical conductivity of the earth formations 6, 8, 12, 14 and to the relative position of the particular earth formation with respect to the transmitter coil 16. The eddy currents in turn induce voltages in the receiver coils 18A–18F, the magnitude of which depends on both the eddy current magnitude and the relative position of the earth formation with respect to the individual receiver coil 18A–18F.

As is understood by those skilled in the art, the degree of correspondence between the voltage induced in a particular receiver coil and the electrical conductivity of the particular earth formation disposed axially between the particular receiver coil and the transmitter coil 16, can depend on the vertical thickness of the particular earth formation, such as shown at H8 for earth formation 8. A more closely spaced receiver coil such as 18A would have more of its voltage induced by eddy currents flowing from entirely within a thinner formation such as 14 (having a thickness shown at H14), than would be the case for a longer spaced receiver coil such as 18F. Conversely, the eddy currents which induce the voltages in receiver coil 18A would more likely correspond to the conductivity within a zone such as shown at RI14, which is affected by fluid "invasion" into its pore spaces from the liquid phase of a fluid 4 used to drill the wellbore (commonly known as "drilling mud", the liquid phase known as "mud filtrate"). The radial distance from the center of the wellbore 2 to which the mud filtrate penetrates the particular earth formation can be different for each formation. A more deeply invaded zone DI14 in formation 14 is shown in comparison to a more shallow invaded zone DI8 in formation 8. Other formations, such as 6 and 12, may be substantially impermeable to fluid flow and therefore may not have invaded zones at all. The radial depth of invasion, such as DI8 or DI14, is typically not known at the time the instrument 10 is moved through the wellbore 2.

The drilling mud 4 itself can be electrically conductive. Eddy currents can flow in such conductive drilling mud, and therefore the voltages induced in each of the receiver coils 18A–18F can also partially depend on the conductivity of the mud 4 and the diameter of the wellbore, shown at D. As is understood by those skilled in the art, the wellbore diameter D is subject to variation as a result of "caving" or "washout". Devices (calipers) for measuring the wellbore diameter D are well known in the art, but are typically impractical to use in the process of correcting the receiver coil signals for the effects of eddy current flow in the wellbore 2. The manner in which the present invention corrects voltage signals from each of the receiver coils 18A–18F for the effects of eddy currents flowing in the wellbore 2 without the use of a caliper will be further explained.

The signals corresponding to the voltages in each receiver coil 18A–18F can be transmitted along the cable 22 to surface electronics 24. The surface electronics 24 can include detectors (not shown) for interpreting the signals from the instrument 10 and a computer 26 to perform the process according to the present invention on the signals transmitted thereto.

As is understood by those skilled in the art, voltages are induced in each receiver coil 18A–18F which correspond to apparent electrical conductivity of all of the media surrounding the instrument 10. The media include the earth formations 6, 8, 12 and 14 and the drilling mud 4 in the wellbore 2 which may be at least partially conductive. The source of the voltages induced in the receiver coils 18A–18F having been explained, the method by which the present invention processes the signals corresponding to the voltages into measurements of electrical conductivity of the earth formations 6, 8, 12, 14 will now be explained.

As is understood by those skilled in the art, the correspondence between the magnitude of the voltages induced in each receiver coil 18A–18F and the conductivity of the media surrounding the instrument 10 is affected by a phenomenon referred to as the "skin effect". In the present embodiment of the invention, the voltage signals induced in each receiver coil 18A–18F can be adjusted to compensate for the skin effect to more precisely correspond to the conductivity of the media surrounding the instrument 10.

A particular advantage of using the apparatus as disclosed in the Beard et al '761 patent, supra, as it relates to the present invention, is that the transmitter coil therein is energized with alternating current having a plurality of different component frequencies, and the SPU disclosed in Beard et al '761 is adapted to generate signals which can be interpreted as to the magnitude of the induced voltages at each one of the plurality of component frequencies.

The present invention includes the step of extrapolating the frequency-dependent response of the receiver coils 18A–18F to the response which would obtain at an alternating current frequency equal to zero. In the present embodiment of the invention, the component frequencies can include 10, 30, 50, 70, 90, 110, 130 and 150 kilohertz (KHz), which as explained in the Beard et al '761 patent can be performed by energizing the transmitter coil with 10 KHz square wave current. It is to be understood that the number of component frequencies and the values of each component frequency selected for use in the present invention are a matter of convenience for the system designer and are not to be construed as a limitation on the present invention. The present invention can perform as described herein using a smaller number of frequencies, or using different frequencies. Using eight frequencies as disclosed herein provides a high degree of accuracy in extrapolation of the response of the receiver coils 18A–18F to zero frequency.

The following discussion is provided to explain the derivation of the method used in the present invention to extrapolate the response of the receiver coils to zero frequency. The electric field induced by a current loop disposed in a conductive medium can be described by the following integral equation:

$$E_\phi(r_0,z_0) = \qquad (1)$$

$$E_\phi^0(r_0,z_0) + i\omega\mu \int_{-\infty}^{\infty} dz \int_0^{\infty} dr(\sigma-\sigma_0) A_\phi(r_0,z_0\ r,z) E_\phi(r,z)$$

where $A_\phi$ represents the vector potential of an auxiliary current loop having 1 ampere current flowing within the loop. The loop is coaxial with the axis of symmetry and positioned in a plane having the vertical coordinate z and radius r. The derivation of equation (1) and a description of how to calculate the electric field of a current loop is described, for example, in P. A. Eaton, "3D Electromagnetic Inversion Using Integral Equations", Geophysical Prospecting, Vol. 37, pp 407–426, 1989. The so-called "background conductivity" $\sigma_0$ is typically selected to facilitate calculation of the primary electric field $E_\phi^0(r_0, z_0)$. For example, the background conductivity can be selected to represent a substantially homogeneous medium having uniform spatial distribution of conductivity.

The vector potential of the current loop may be expressed as a Taylor expansion as shown here:

$$A_\phi = \sum_{k=0}^{k=\infty} a_{k/2}(-i\omega)^{k/2} \qquad (2)$$

From the formula for the vector potential, it can be determined that $a_{1/2}=0$. A Taylor expansion may also be shown for the primary electric field based on the Taylor expansion for the vector potential of the auxiliary current loop. The Taylor expansion for the primary electric field can be shown as:

$$E_\phi^0 = \sum_{k=2}^{k=\infty} e_{k/2}^0(-i\omega)^{k/2}; \quad e_{3/2}^0 = 0 \qquad (3)$$

By substitution of the Taylor expansions for the vector potential of the auxiliary current loop and for the primary electric field, an expression for the electric field can be shown as:

$$E_\phi = \sum_{k=2}^{k=\infty} e_{k/2}(-i\omega)^{k/2} \quad (4)$$

$$e_1 = e_1^0$$

$$e_{3/2} = 0$$

$$\vdots$$

$$e_{5/2} = e_{5/2}^0$$

The vertical component of the magnetic field can be determined by Maxwell's equations as:

$$H_z = \frac{1}{i\omega\mu} \frac{1}{r_0} \frac{\partial}{\partial r_0}(r_0 E_\phi) \quad (5)$$

and by substitution into the Taylor expansions for the electric field can be shown as:

$$H_z = \sum_{k=-\infty}^{k=0} \Theta_{k/2}(-i\omega)^{k/2} \quad (6)$$

$$\Theta_{1/2} = 0$$

$$0$$

$$\Theta_{3/2} = \Theta_{3/2}^0$$

The term in equation (6) which is proportional to $\omega^{3/2}$ is generated by the primary field and is not affected by any inhomogeneities in the media surrounding the instrument (10 in FIG. 1). The voltages induced in the receiver coils (18A–18F in FIG. 1) generally correspond to the imaginary component of the magnetic field, which can be shown in the following Taylor expansion:

$$\Im[H_z] = \sum_{k=2}^{k=\infty} \Theta_{k/2}^0 \omega^{k/2} \quad (7)$$

$$\Theta_{2j} = 0; \quad j = 1, 2, \ldots,$$

Finally, an expression for the apparent conductivity can be shown as:

$$\sigma_a = \frac{\Im[H_z]}{K} \quad (8)$$

where K represents a constant related to the frequency ω and the geometry of the transmitter (16 in FIG. 1) and each of the receiver coils (18A–18F in FIG. 1). The apparent conductivity for each receiver coil can therefore be represented by the following Taylor expansion:

$$\sigma_a = \sum_{k=0}^{k=\infty} s_{k/2} w^{k/2} \quad (9)$$

$$s_{2j-1} = 0; \quad j = 1, 2, \ldots,$$

The Taylor expansion in equation (9) for the apparent conductivity, $\sigma_a$ can be calculated as shown in the following expression:

$$\begin{bmatrix} \sigma_a(\omega_1) \\ \sigma_a(\omega_2) \\ \vdots \\ \vdots \\ \sigma_a(\omega_{m-1}) \\ \sigma_a(\omega_m) \end{bmatrix} = \begin{bmatrix} 1 & \omega_1^{1/2} & \omega_1^{3/2} & \cdots & \omega_1^{n/2} \\ 1 & \omega_2^{1/2} & \omega_2^{3/2} & \cdots & \omega_2^{n/2} \\ \vdots & \vdots & \vdots & & \vdots \\ \vdots & \vdots & \vdots & & \vdots \\ 1 & \omega_{m-1}^{1/2} & \omega_{m-1}^{3/2} & \cdots & \omega_{m-1}^{n/2} \\ 1 & \omega_m^{1/2} & \omega_m^{3/2} & \cdots & \omega_m^{n/2} \end{bmatrix} \begin{bmatrix} s_0 \\ s_{1/2} \\ s_{3/2} \\ \vdots \\ \vdots \\ s_{n/2} \end{bmatrix} \quad (10)$$

wherein m represents the number of component frequencies (which in the present embodiment as previously explained can be equal to eight), and n can be selected from a Taylor series expansion for an apparent conductivity integral.

The ultimate objective of the expansion series in equation (10) is to solve for the coefficient at the zero-frequency limit—$S_0$. Solving a system according to equation (10) will calculate a receiver coil response approximately equal to that described in H. G. Doll, "Introduction to Induction Logging and Application to Logging Wells Drilled with Oil Base Mud", AIME Transactions Vol. 1, No. 6, pp 148–162 (1949), for the zero frequency limit of the apparent conductivity at each one of the receiver coils (18A–18F in FIG. 1).

Figure 4:
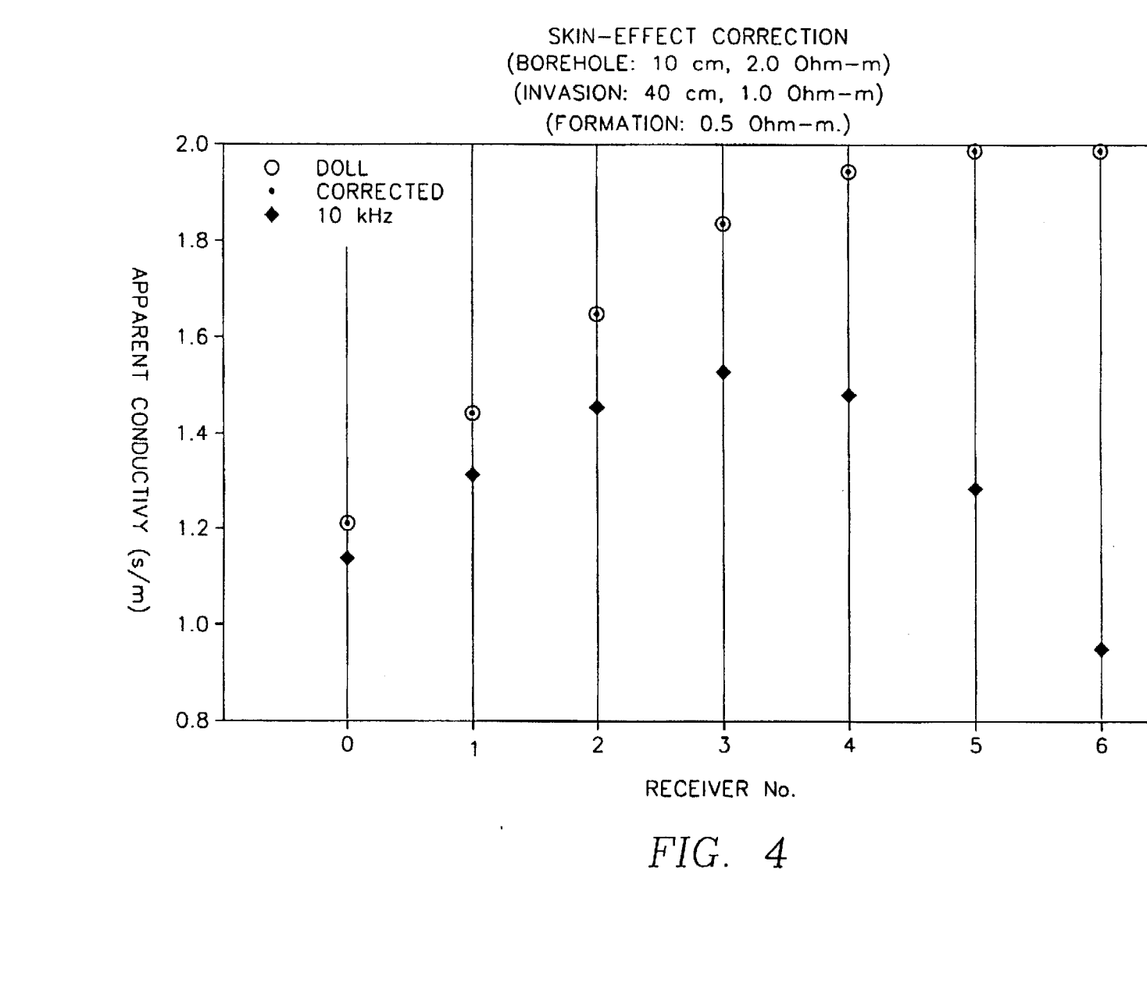
FIG. 4 shows a graphic comparison of simulated response of each one of the receiver coils in the instrument of FIG. 1 both before and after a skin effect correction method according to the present invention. The simulation is for a one-dimensional simulated conductive medium surrounding the tool.

A graph showing the simulated response for each one of the receiver coils (18A–18F in FIG. 1) calculated by solving a system according to equation (10) can be observed by referring to FIG. 4. The graph in FIG. 4 represents simulated response for a wellbore having diameter D equal to 20 cm. The simulation wellbore is considered to be filled with drilling mud having a resistivity of 2.0 ohm-m (conductivity equal to 0.5 S/m). The earth formations in the simulation include an invaded zone (such as shown at RI8 in FIG. 1) having a resistivity of 1.0 ohm-m (equal to a conductivity of 1.0 S/m), and a diameter (DI8 in FIG. 1) of 80 cm. The formation resistivity, R8 in FIG. 1, is 0.5 ohm-m R8 (conductivity 2.0 S/m) for purposes of the simulation. FIG. 4 shows simulated receiver coil signals extrapolated to zero frequency according to the system in equation (10) compared with signals calculated according to the approximation in the Doll reference, supra (the "Doll approximation"). The amount of correction required may be understood by comparison of the signals extrapolated to zero frequency with the signals simulated for a frequency of 10 KHz.

Figure 5:
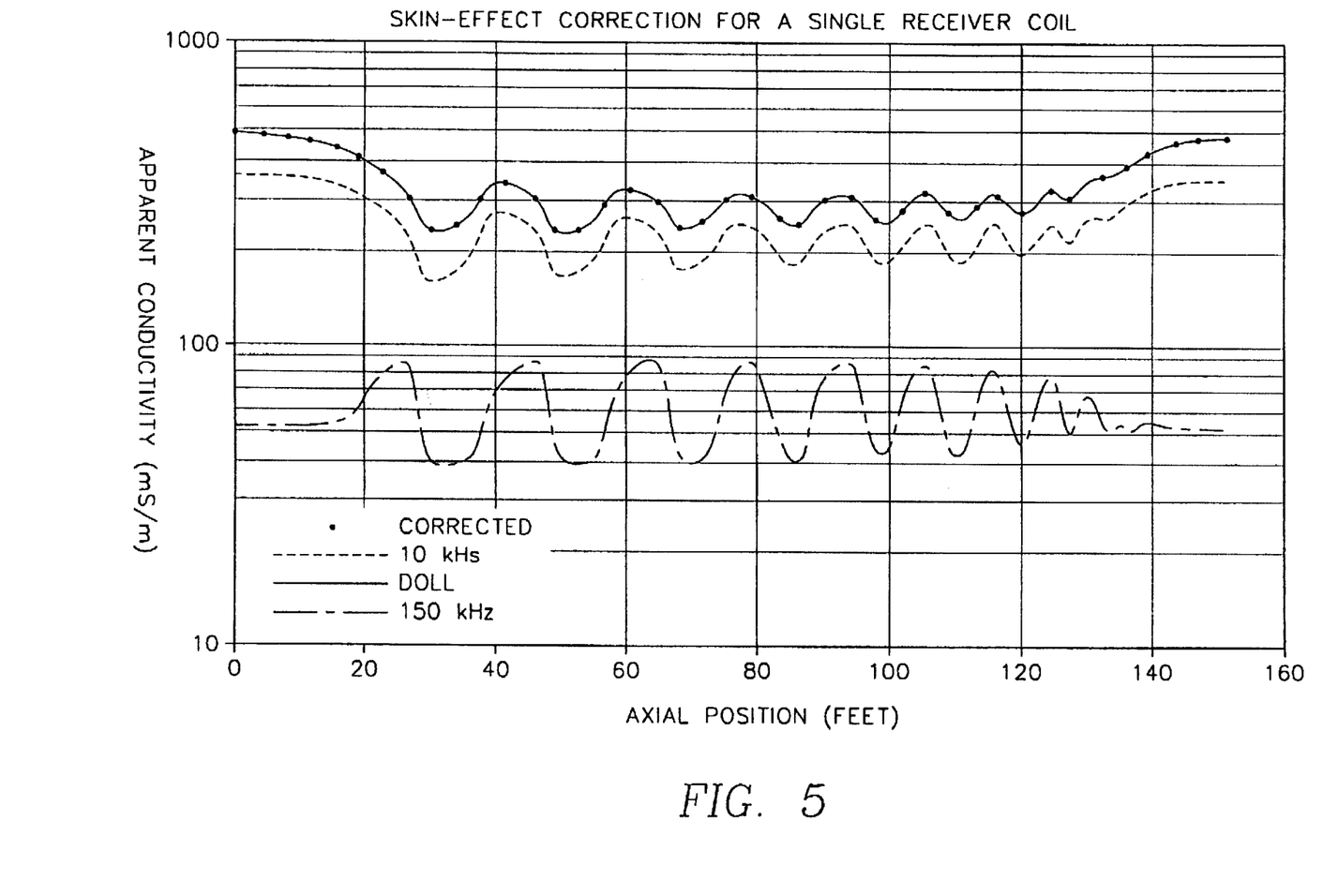
FIG. 5 shows the result of the skin effect correction applied to the response of one receiver coil in the tool of FIG. 1 in a two-dimensional medium consisting of formation blocks, each block having a different conductivity.
Figure 6:
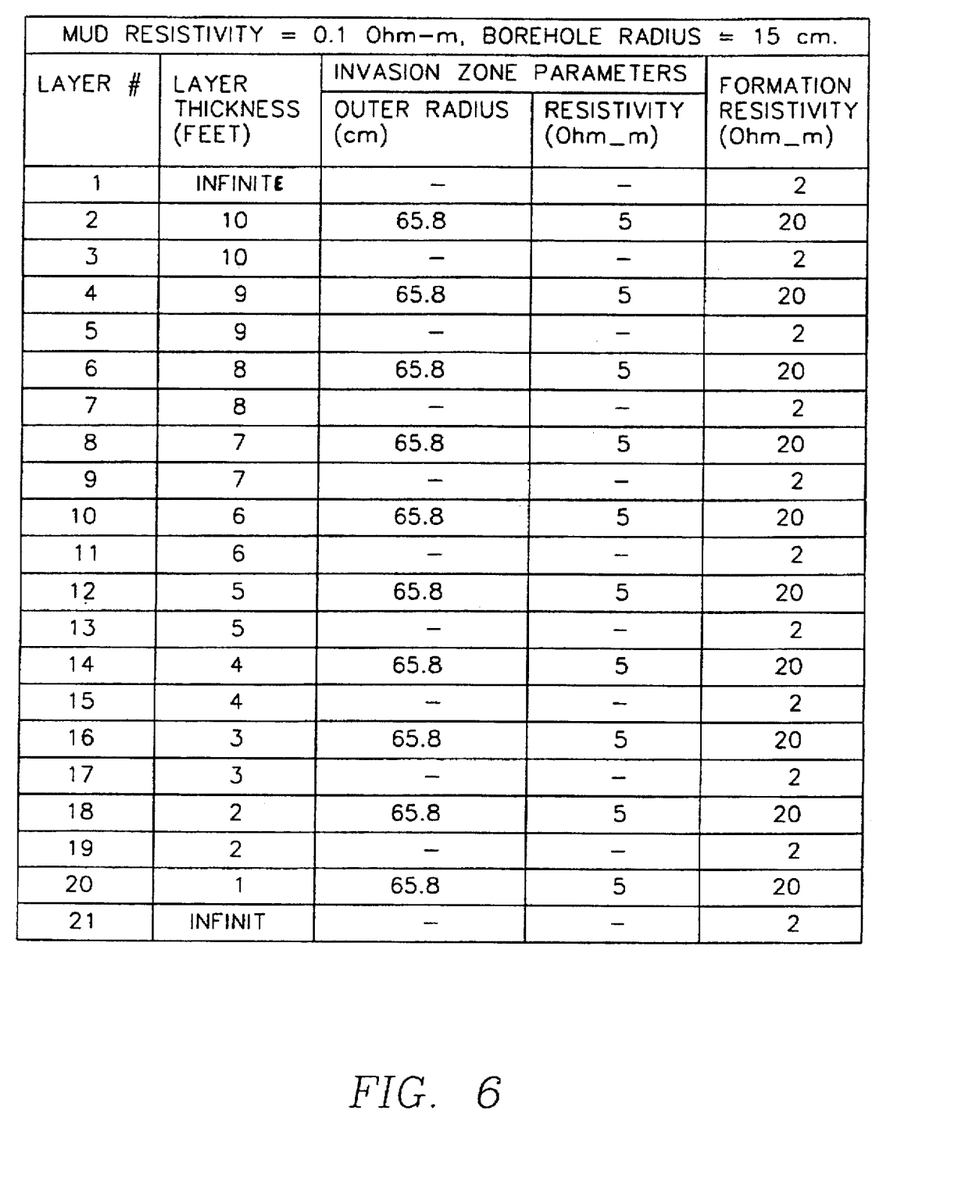
FIG. 6 is a table of the conductivity and geometric parameters for the simulated media whose response is shown in FIG. 5.

The results of another response simulation using the extrapolation method of the present invention for a single receiver coil (such as 18F in FIG. 1) are shown in FIG. 5. FIG. 5 shows a comparison of 10 KHz simulated response, 150 KHz simulated response and the response calculated according to equation (10) compared with the Doll approximation response for a series of earth formations having resistivities according to the table in FIG. 6. The significance of extrapolating the signal response of the receiver coils 18A–18F to the low frequency (Doll approximation) limit will be further explained.

After the skin effect correction is performed, it is desirable to further adjust the signals from each one of the receiver coils 18A–18F for the effect of the eddy current signal which originates in the wellbore 2. Methods for correcting the receiver coils signals are known in the art, one of which is described, for example in G. P. Grove and G. N. Minerbo, "An Adaptive Borehole Correction Scheme for Array Induction Tools", SPWLA 32nd Annual Logging Symposium, pp 1–25, 1991). It is to be understood that the step of correcting the receiver coil signals for the effects of the conductivity of the wellbore 2 is optional in performing the process of the present invention. Correction for wellbore 2 conductivity can improve the accuracy of the final result. Under some conditions, however, particularly when the drilling mud 4 comprises a substantially non-conductive liquid phase, the diameter of the wellbore D is relatively small (typically in a range of 5 to 8 inches where the diameter of the instrument 10 is about 3⅝ inches), and the instrument 10 is substantially centralized in the wellbore 2, the overall effect of the wellbore 2 on the receiver coil signals can be negligible, and the step of correction can be omitted without seriously affecting the accuracy of the result of the inversion process.

The steps of skin effect correction and wellbore signal correction having been explained, the inversion process of the present invention will be described in more detail. The step of skin effect correcting the signals from the receiver coils 18A–18F by extrapolation to zero frequency provides the present invention with a particular advantage over inversion processing methods known in the prior art. Extrapolating the receiver coil responses to zero frequency provides that the incremental response at any particular receiver coil, coming from any particular region in space is proportional to the conductivity of that region of space and is independent of the conductivity distribution in the media surrounding the particular receiver coil.

Simulating the response of the receiver coils at non-zero frequencies by inversion modelling as in the prior art, is substantially slower than the modelling method of the present invention because the modelling method of the present invention can use a partition of the simulated media surrounding the instrument 10 into blocks to evaluate the response of each receiver coil to a variety of different conductivity distributions in the media surrounding the instrument 10 without using any significant additional calculation time to recalculate the receiver coil response for each conductivity distribution provided that the receiver coil responses to at least one conductivity distribution have been calculated. The step of partitioning the media into blocks will be further explained.

Figure 2:
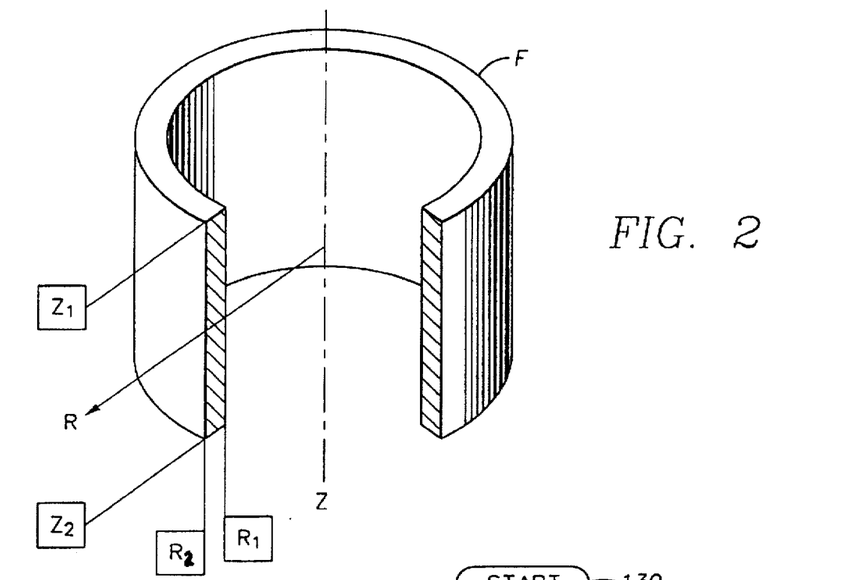
FIG. 2 shows a graphic representation of a formation block used to simulate and mathematically describe the response of the induction tool in FIG. 1.

The present embodiment of the invention calculates a synthetic receiver coil response first by mathematically representing the media surrounding the instrument 10 as a plurality of concentric annular cylinders having dimensions and conductivities which will be further explained. An example of such an annular cylinder can be observed by referring to FIG. 2. In FIG. 2, the instrument (10 in FIG. 1) can be represented as having zero external radius, and is therefore not shown separately in FIG. 2. A particular portion of the media (which can include the earth formations 6, 8, 12, 14 in FIG. 1) surrounding the instrument (10 in FIG. 1), can be represented as a "formation block" F. Formation block F is shown as an annular cylinder coaxial with the center of the wellbore (2 in FIG. 1) and coaxial with the representation (not shown separately in FIG. 2) of the instrument (10 in FIG. 1). The formation block F can be described in radial coordinates as having an inner radius from the wellbore axis $r_1$, an outer radius $r_2$ and axial boundaries represented by $z_1$ and $z_2$. A simplifying assumption in construction of earth formation models is that the media surrounding the instrument (10 in FIG. 1) are axially symmetric. The formation block F can therefore be represented in a single plane as a rectangular section of the media surrounding the instrument. The incremental contribution of the formation block F to the total response of any particular receiver coil (18A–18F in FIG. 1) is dependent on the boundary coordinates of the block, namely $r_1$, $r_2$, $z_1$ and $z_2$. The response of any receiver coil in the instrument (10 in FIG. 1) to the entire media surrounding the instrument (10 in FIG. 1) can be represented as the sum of the incremental responses from a plurality of formation blocks whose combined areas equals the total space surrounding the instrument (10 in FIG. 1). The response of the i-th receiver coil to the k-th formation block can be represented according to the approximation in the Doll reference, supra, as:

$$\sigma_a^i = \sigma_t^k \cdot G_k^i \qquad (11)$$

wherein $\sigma_t^k$ represents the actual (true) conductivity of the k-th formation block, and $G_k^i$ represents the "geometric factor" (a term used in the Doll reference, supra) at the i-th receiver coil of the k-th formation block.

The present invention further reduces the number of calculations required to model the response of the i-th receiver coil by substitution of a new variable $S^i(r, z)$ which can be defined according to the following expression:

$$S^i(r,z) = G^i(r_1=0, r_2=r, z_1=-\infty, z_2=z) \qquad (12)$$

Figure 3:
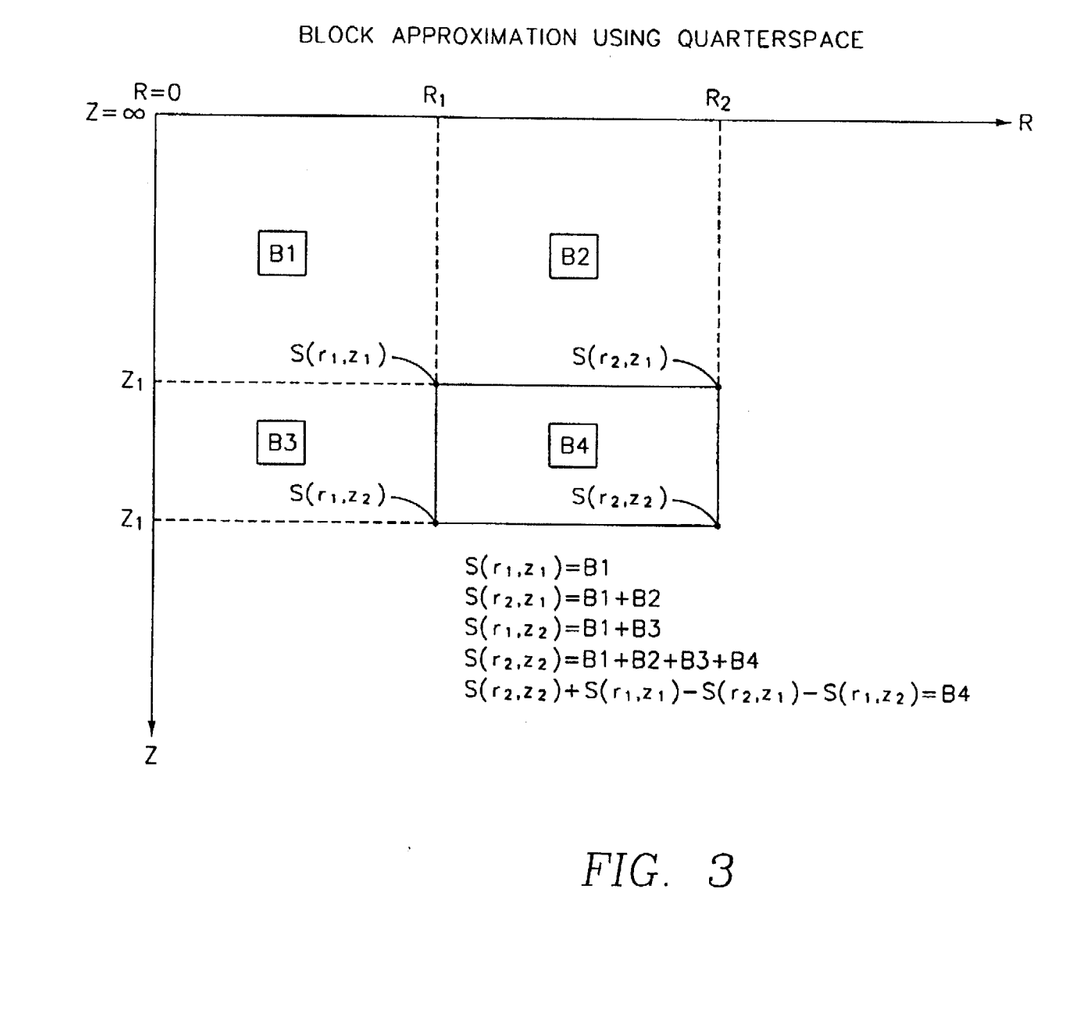
FIG. 3 graphically shows a method of representing the incremental response of formation blocks using a reduced number of parameters.

As shown in FIG. 3, $S^i(r, z)$ represents the geometric factor (see the Doll reference, supra) of a quarter-space bounded on the upper left by ($r=0$, $z=-\infty$) and on the lower right by ($r$, $z$). As can be inferred by referring to FIG. 3, the geometric factor of any particular formation block (B1, B2, B3, B4) can be calculated by combining four of the $S^i(r, z)$ responses for those quarter spaces. The calculation can be performed according to the following expression:

$$G^i(r_a,r_b,z_a,z_b) = [S^i(r_a,z_a) + S^i(r_b,z_b) - S^i(r_a,z_b) - S^i(r_b,z_a)] \qquad (13)$$

The geometric factor for any particular quarter-space ranges from zero at ($r=0$, $z=-\infty$) to 1 at ($r=\infty$, $z=\infty$). The expression in equation (13) allows expressing the geometric factor, which is a function of four independent variables, as a combination of four functions each represented by only two independent variables.

Expressing the geometric factor in terms of only two variables facilitates the use of a so-called "spline interpolation". The present embodiment of the invention can include a spline interpolation including 159 points in the radial direction and 319 points in the vertical direction for calculating the geometric factor of the response of each receiver coil (18A–18F in FIG. 1). It is to be understood that the number of interpolation points selected for use in the present invention is a matter of convenience for the system designer and is not to be construed as a limitation on the present invention. A suitable method for constructing a spline interpolation which can be used in the present invention is described, for example in C. De Boor, "A Practical Guide to Splines", Springer-Verlag, New York, 1978. The use of the formation block system for modelling the response for the receiver coils (18A–18F in FIG. 1) will be further explained.

After the signal from each receiver coil (18A–18F in FIG. 1) is corrected for the skin effect, the present invention next includes steps for calculating parameters for a set of earth formations (6, 8, 12, 14 in FIG. 1) which would produce the actual measured response of each receiver coil (18A–18F in FIG. 1) at each axial position along the wellbore (2 in FIG. 1). At each axial position ($z_j$, where $j=1, N$) in the wellbore (2 in FIG. 1), each one of the receiver coils, here represented by the ordinal variable i, ($i=1, 2, \ldots, N_c$, where $N_c$ represents the number of receiver coils) makes a measurement of apparent conductivity, here represented by $\sigma_a$ (i, j). The total number of measurements can be represented by $N_T = N_c \times N$. All the measurements of apparent conductivity can be represented by the following expression:

$$\sigma_a(i,j) = \sum_{l=1}^{l=N_B} \sigma_l \cdot G_l^i(j) \qquad (14)$$

wherein $G_l^i$ (j) represents the geometric factor of the l-th formation block (such as B1 in FIG. 3), $\sigma_l$ represents the conductivity of the l-th formation block, and $N_B$ represents the total number of formation blocks. By establishing a sequential numbering for the measurements made by all of the receiver coils (18A–18F in FIG. 1) at each axial position of the instrument (10 in FIG. 1), the previous expression can be represented in vector notation as:

$$\sigma_{a,n} = \sum_{m=1}^{m=N_B} g_{n,m} \sigma_m \qquad (15)$$

$$g_{n,m} = G_m^i(j)$$

-continued $$n = N_e(j-1) + i$$

$$\vec{\sigma}_a = \hat{g}\,\vec{\sigma} \tag{16}$$

In the present invention simulated conductivities of each formation block and the simulated geometry of each formation block can be optimized so that the difference between the apparent conductivities (measured by each receiver coil) and the simulated apparent conductivities is minimized. The conductivities can be represented by a vector parameter group $p_\sigma$, and the geometries can be represented by another vector parameter group $p_g$. The minimization process can be described in vector notation by the following expression:

$$\|\vec{\sigma}_a - \hat{g}\vec{\sigma}\| = \min_{P_\sigma P_g} \tag{17}$$

In the present invention, the minimization can be performed by using a least squares norm. For example:

$$\|\vec{\sigma}_a - \hat{g}\vec{\sigma}\| = \sqrt{\sum_{j=1}^{j=N_t}(\vec{\sigma}_a - \hat{g}\vec{\sigma})^2} = \min_{P_\sigma P_g} \tag{18}$$

Other types of minimization will perform as required in the present invention. Least squares is shown only as an example. It is to be understood that the least squares form of minimization is not to be construed as a limitation on the invention.

The present invention provides further improved processing speed in calculating the formation parameters which will reproduce the receiver coil measurements by using a "multi-resolution" processing format. The multi-resolution processing format can be generally described as: first, selecting an initial set of formation parameters; second, optimizing the parameters according to equation (18); third, generating a new set of parameters including at least one additional element in the parameter set (for example, an additional layer of earth formation); fourth, repeating the step of optimization; and repeating the process from the step of generating the parameter set including the at least one additional element. This set of steps is continued until there is no substantial improvement in agreement between the actual receiver coil measurements and those measurements simulated from the earth formation parameters in the parameter set.

The process just described can be represented mathematically by considering a series of earth formation parameter sets, referred to as "models". The models, which can be represented by $M_1$, $M_2$, $M_3$, . . . $M_n$, each successively include more formation blocks (such as B4 in FIG. 3) than in the previous model. For the first model, $M_1$, (represented by parameter sets $(p_g)^1$ and $(p_\sigma)^1$) the optimization can be performed according to equation (18) as shown in the following expression:

$$\|\vec{\sigma}_a - \hat{g}_1\vec{\sigma}_1\| = \min$$

$$\vec{\sigma}_a - \hat{g}_1\vec{\sigma}_1 = \vec{R}_1 \tag{19}$$

wherein $\sigma_a$ represents the measured signal and $R_1$ represents the residual signal, or minimum difference between the receiver coil measurements and the calculated (simulated) measurements generated according to the parameter set used in model $M_1$.

The next step in the process of the present invention is to again perform the minimization, but using model $M_2$ in accordance with the following expression:

$$\|\vec{R}_1 - \hat{g}_2\vec{\sigma}_2\| = \min$$

$$\vec{R}_1 - \hat{g}_2\vec{\sigma}_2 = \vec{R}_2 \tag{20}$$

$$\vec{s}_2 = \hat{g}_2\vec{\sigma}_2$$

wherein $R_2$ represents the second residual signal, or minimum difference, between the first residual signal $R_1$ and the simulated receiver coil measurements according to the parameter set used in model $M_1$. $g_2$ represents the geometric factor matrix of the geometric parameter set $(p_g)^2$ and $\sigma_2$, represents the calculated optimum conductivity parameter set $(p_\sigma)^2$.

The process shown in equations (19) and (20) can be repeated for successive models $M_3$, . . . $M_n$ until the residual $R_n$ falls below a predetermined threshold. In the present embodiment of the invention, the threshold can be selected by the system operator to conform to applicable operating conditions, such as the speed at which the instrument (10 in FIG. 1) moves through the wellbore (2 in FIG. 1), and the amount of detail, as to the numbers of earth formations and accuracy of numerical calculation, required by the system operator.

Figure 7:
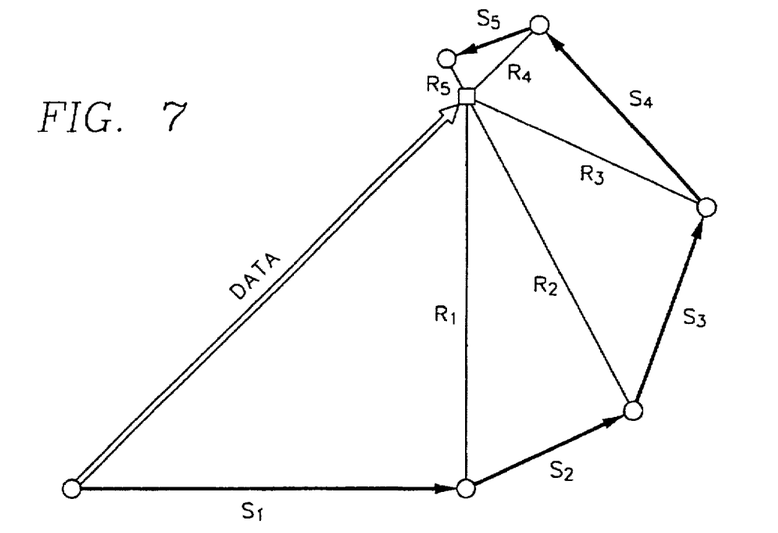
FIG. 7 is a graphic representation of the multi-resolution inversion scheme of the present invention in which every sequential application of the inversion process improves radial and vertical resolution.

FIG. 7 shows a graphic representation of the modelling system of the present invention. As shown in FIG. 7, successive models $M_1$, $M_2$, $M_3$, . . . $M_N$ have responses which generate signals $s_1$, $s_2$, $s_3$, . . . , $s_n$ and successively smaller residuals $R_1$ . . . $R_n$. The final model can be described as the sum of all the previous models, as shown in the following expression:

$$\sigma(r,z) = \sum_{i=1}^{i=n} \sigma_i(r,z) \tag{21}$$

The present invention can further improve the speed of processing by separating the optimization step into two parts. The first part is optimization of the linear parameters. The second part is optimization of the non-linear parameters. Since the present invention provides skin effect correction extrapolated to the zero frequency limit, as previously explained, the incremental response of each formation block used in a particular model is linearly related to the conductivity of that formation block. Therefore in the present invention, the conductivity parameters $p_\sigma$ can be separately optimized as a linear parameter set. The geometric parameters $p_g$ can be optimized separately. For example, the m-th step of the optimization process can be represented by the following expression:

$$\|\vec{R}_{m-1} - \hat{g}_m\vec{\sigma}_m\| = \min \tag{22}$$

A least squares minimization for the vector $\sigma_m$ in equation (22) can be represented by the expression:

$$\vec{\sigma}_m = (\hat{g}_m^T\hat{g}_m)^{-1}\hat{g}_m^T\vec{R}_{m-1} \tag{23}$$

By substitution of equation (23) into equation (20), the solution to the minimization of the non-linear parameters, $P_g$, can be described in the following expression:

$$\|\vec{R}_{m-1} - \hat{g}_m(\hat{g}_m^T\hat{g}_m)^{-1}\hat{g}_m^T\vec{R}_{m-1}\| = \min \tag{24}$$

In the present invention it is preferable to minimize the "relative misfit" as defined by the result of equation (24) between the modelled response and the actual receiver coil response according to the following expression:

$$\sum_{j=1}^{j=N_t} \left[ \frac{R_{m-1}^j - [\hat{g}_m(\hat{g}_m^T\hat{g}_m)^{-1}\hat{g}_m^T\vec{R}_{m-1}]^j}{R_{m-1}^j} \right]^2 = \min \quad (25)$$

wherein $N_t$ represents, as previously described herein, the total number of measurements.

Figure 8:
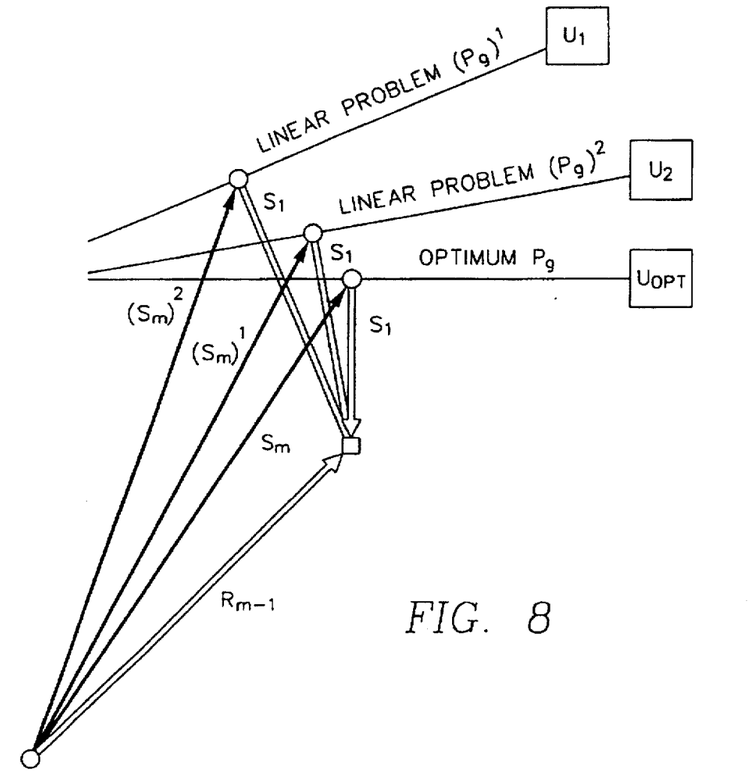
FIG. 8 is a graphic representation of how the present invention separates linear and non-linear model parameters.

The process of separation of linear- and non-linear parameters is shown graphically in FIG. 8. First, an initial set of non-linear parameters $(p_g)^1$, is selected. This selection defines a first linear target surface $U_1$ which is to be targeted by an optimization solution (which in the present embodiment can be the least squares solution as previously described) represented by $(S_m)^1$. The optimum solution $(S_m)^1$ is generated by determining the optimum conductivity parameter set $p_\sigma$. The residual vector is represented by $(R_m)^1$. Next, a new set of non-linear parameters $(p_g)^2$, is generated which establishes a second linear target surface $U_2$. The optimization of the linear parameters can then be repeated as in the first step, thereby generating a second optimization solution $(S_m)^2$. If the residual vector $(R_m)^2$ of the second step is smaller than $(R_m)^1$, then the non-linear parameter set $(p_g)^2$ can be used in the next step of the inversion calculation since it would be consistent with convergence of successive solutions upon the target vector. The target vector, as previously explained, represents the residual signal $R_m$. If instead the next set of non-linear parameters $(p_g)^2$ does not result in the second residual vector $(R_m)^2$ being smaller than the first residual vector $(R_m)^1$, then an adjustment, typically to the number of axial elements (such as represent layers of the earth formations), can be made to the second non-linear parameter set $(p_g)^2$ and the optimization process can be repeated. By splitting the linear- and non-linear parameters, the present invention provides increased processing speed by reducing the total number of parameters used in the optimization process approximately by a factor of two and by bringing the initial guess for the non-linear optimization close to the final optimum solution.

In order to further improve the speed at which the overall inversion may be performed, the process of the present invention further includes subdividing the optimization steps previously described herein into a series of substantially contiguous "data windows". Data windows are subsets of all of the measurements made by each of the receiver coils (18A–18F in FIG. 1). As is understood by those skilled in the art, as the instrument (10 in FIG. 1) is moved axially through the wellbore (2 in FIG. 1), the signals from each receiver coil (18A–18F) are typically recorded in the form of measurement samples. The samples are typically recorded in a way which enables identification of the axial position within the wellbore 2 (typically the depth in the wellbore 2) at which each measurement sample was generated. A well log comprises all of the signal samples from each receiver coil 18A–18F identified by the depth at which each sample was generated. The windows each typically represent subsets of all of the signal samples within a predetermined depth interval, which in the present embodiment can be about 50 feet. The window depth interval used in the present invention is based on the geometric factor of the instrument 10 at axially separated positions from the center of the instrument 10. As is understood by those skilled in the art, induction well logging instruments having the transmitter-to-receiver coil spacings typically used in the art have substantially zero geometric factor at axial positions about 25 feet from the center of the instrument. A window interval of 50 feet should be sufficiently long, therefore, to perform the process of the present invention, but this window length should not be considered as an exclusive representation of window lengths which can be used.

Typically each window includes contiguous signal samples from each receiver coil over the entire depth interval of the window. A process step in the present invention can include using all the signal samples within a particular window as input data for the process, and the process step can then be performed to generate one or more output sample values for each wellbore 2 depth included within the particular window. The window can then be "moved", which means including signal samples in an input data set which correspond to a different axial instrument 10 position (depth) from within the wellbore 2. Typically the windows are "moved" to include a set of signal samples contiguous with, or adjacent to, the previous set of signal samples.

The present invention can further subdivide input data for the inversion process into three substantially contiguous sub-windows referred to as the "predictor" (P), the "corrector" (C) and the "upgrader" (U). The significance of the sub-windows and the processes performed in each sub-window (P, C, U) will be further explained.

The present invention further improves the speed at which the results can be generated by additionally subdividing the processing into a so-called "near-zone" run and a so-called "far-zone" run. The near-zone run typically uses only signal samples corresponding to the receiver coils more closely axially spaced to the transmitter coil (such as 18A, 18B and 18C in FIG. 1). As previously explained, the closely spaced receiver coils (18A, 18B, 18C in FIG. 1) are typically more responsive to earth formations having smaller "thickness", such as 14 in FIG. 1. This response is generally referred to as having high vertical resolution. The high vertical resolution of the measurements from the closely spaced receiver coils (18AQ, 18B, 18C) is used in the near-zone run particularly to determine the number of, and the axial position of, different axial elements which are to be present in the final model of the media surrounding the instrument 10. The axial elements typically represent earth formations having different conductivities and thicknesses.

After the near-zone run is performed in order to establish the number of and the axial position of the various axial elements in the final model, the far-zone run can be performed. The far zone run typically uses the signals from all of the receiver coils (18A–18F in FIG. 1) in the instrument 10. As previously explained, the signals from the receiver coils (such as 18D, 18E, 18F in FIG. 1) more axially spaced apart from the transmitter coil (16 in FIG. 1) typically are responsive to the conductivity of earth formations radially separated from the wellbore (2 in FIG. 1). The responses of the receiver coils (18D, 18E, 18F in FIG. 1) more axially spaced apart from the transmitter coil (16 in FIG. 1) can therefore be used to calculate conductivities within the zones of the earth formations not subject to invasion (such as RT8 and RT14 in FIG. 1).

In an alternative method of processing according to the present invention, initial estimates of the positions of any radial boundaries (such as B8 and B14 in FIG. 1) can be made during the near-zone run. The conductivity of the zones subject to invasion (such as RI8 and RI14 in FIG. 1) can be estimated during the near zone run. The final radial locations of the boundaries (B8 and B14 in FIG. 1) as well as the conductivities of the zones not subject to invasion (such as RT8 and RT14 in FIG. 1) can be determined during the far zone run. For the reasons described herein concerning the nature of the responses of the closely spaced receiver coils (18A, 18B, 18C in FIG. 1), it is preferable to perform the calculation of positions and numbers of the axial elements only in the near zone run. It is to be understood that any axial element defined by the result of the near-zone run can include more than one radial boundary, each of which can separate two radial elements. Each of the two radial elements separated by each radial boundary can have a different conductivity. As is understood by those skilled in the art, some earth formations are subject to partial, or incomplete, invasion of the liquid phase of the drilling mud (4 in FIG. 1) into a portion of the earth formation. This portion of the earth formation is typically referred to as a "transition zone" and can have a resistivity which varies between the invaded zone resistivity (such as RI8 in FIG. 1) and the uninvaded zone resistivity (such as RT8 in FIG. 1).

Figure 9:
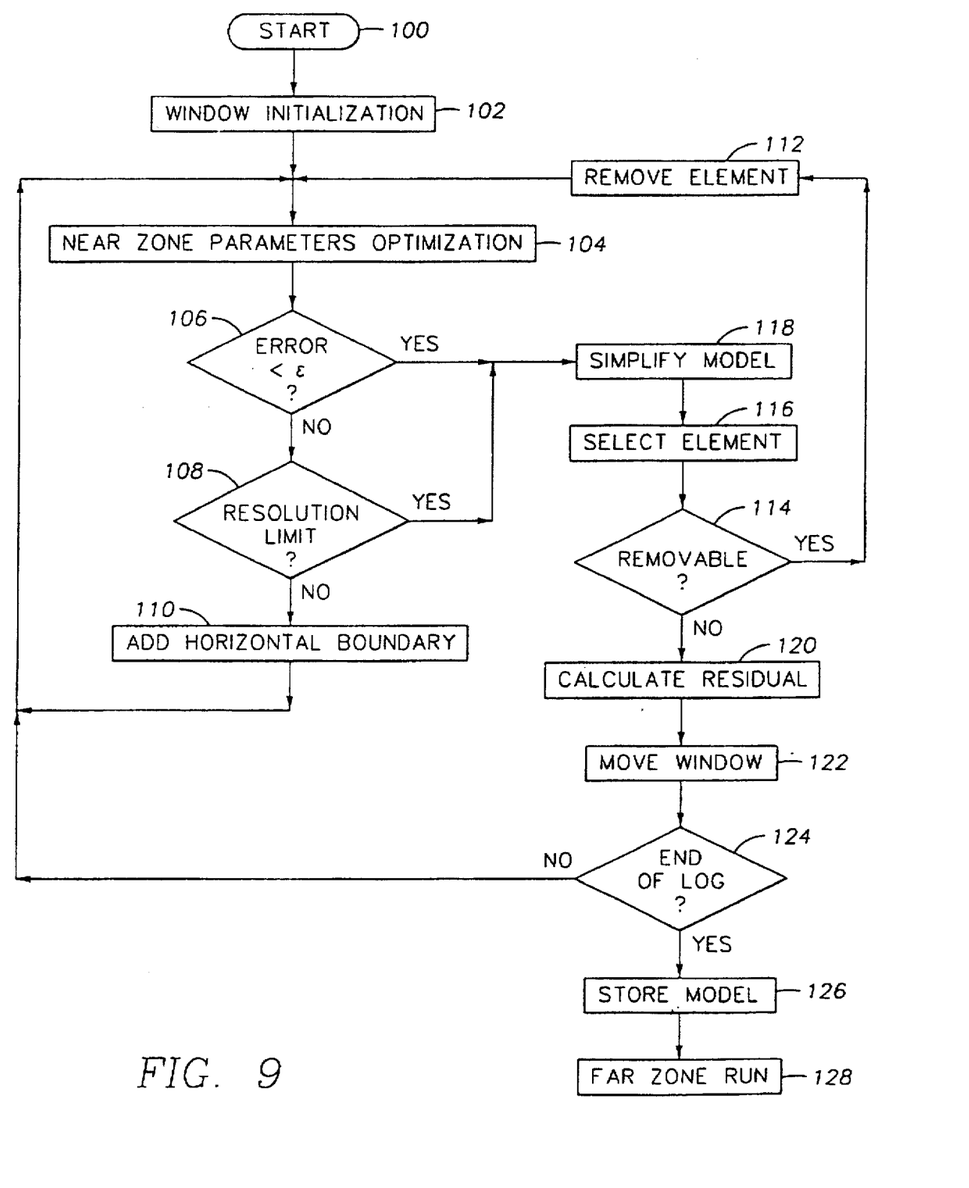
FIG. 9 is a flow chart of the process of the invention for the "near-zone".

Referring now to FIG. 9, the processing of the measurements in the windows will be explained. The near zone run is begun 100 by initializing the windows, at 102. The step of initializing the windows 102 includes representing the C window as having a single homogeneous medium filling the entire depth interval of the C window. The media in the U window and beyond and in the P window and beyond can be initially represented by conductive half spaces. Initial values of conductivity in each window can be selected by means of linear optimization as in Equation (25).

The next step in the process is to optimize the parameters in each one of the windows (U, C, P) at 104. The optimization can be performed as previously described herein. The process of optimizing includes introducing axial elements in the C window which may be spaced apart as short a distance as the predetermined resolution limit. Axial elements may be introduced into the P window with commonly increasing axial spacing between the axial elements as the axial distance from the boundary of the C and P windows increases. The function of the conductivity value assigned to the U window is to adjust the conductivities calculated for the axial elements in the C window as the windows are moved at 122 as will be further explained.

After the conductivity parameters are optimized, the error (least squares difference between the model and the actual measured receiver coil signals) is checked at 106 to determine if it is less than a predetermined threshold, which can be selected by the system operator and typically ranges from 1 to 10 percent depending on the accuracy requirements of the system operator and the speed at which the instrument is moved through the wellbore. At 106, the model is tested against the receiver coil signals (hereinafter called the "data"). If the error exceeds the threshold, the model is checked to see of a resolution limit at 108 has been attained. The resolution limit represents the smallest axial thickness feature which the system operator desired to be calculated as a result of the entire process. The selection of resolution limit depends primarily on the speed at which the system operator desires the model result to be generated or on the speed at which the instrument (10 in FIG. 1) is moved through the wellbore (2 in FIG. 1). If the resolution limit has not been reached, the model can be altered, at 110, by inclusion of an additional axial element boundary. The additional boundary is typically initially included substantially in the center of one of the axial elements existing in the model. The parameters can be again optimized 104 and the error checked 106. This process can be repeated until the resolution limit is reached at 108 or the estimated misfit is less than the predetermined level.

If the error is below the threshold or the minimum axial spacing is reached, a test is performed to determine of one boundary between two axial elements can be removed, at 118, from the model without materially altering the overall error between the model and the data. The element selected, at 116, to be removed is typically selected on the basis of conductivity of one axial element being substantially equal to the adjacent element. At 114, the model is examined to see if any elements meet the conductivity match threshold. At 112, if such an element exists it is removed and the model is again optimized 104 and tested 106 for error fit. If the error once again falls below the threshold, the removal process is repeated until the final model exhibits no removable elements, at 114.

If no elements are removable, the residual is calculated at 120 and the windows can be moved at 122. In the process of moving the windows U, C, P, the model obtained in the P window prior to moving the windows is used as the initial model in the C window which will be superpositioned on the prior P window location. The contents of the U window is used to adjust the conductivities in the prior C window location and this model then copied to a buffer (not shown) or other type of storage as part of an intermediate near zone model.

If the end of the log is reached, at 124, after a particular move of the windows, then the intermediate near zone model is stored 126, and the axial elements determined in the near-zone run are then used to perform the far zone run.

As previously explained, the receiver coils (such as 18E and 18F in FIG. 1) at a greater axial spacing from the transmitter coil (16 in FIG. 1) are more sensitive to conductivity in parts of the earth formations which are at a greater radial distance from the center of the wellbore (2 in FIG. 1). In the processing method of the present invention is structured into the near-zone run to determine the number of and the positions of axial elements in the resulting model and the far-zone run is performed primarily to determine the positions of radial conductivity boundaries and the conductivities of the earth formations on both sides of the radial conductivity boundaries. Referring once again to FIG. 1, earth formation 8, which can be one of the formations subject to invasion, can include a radial boundary B8 separating the invaded zone RI8 and the uninvaded zone RT8. The radial position DI8 of the radial boundary B8 as well as values of conductivity in the uninvaded zone RT8 and the invaded zone RI8 can be determined by using the signals from all of the receiver coils 18A–18F in the far zone run. The same process can be used to determine the presence and position of radial boundaries in other earth formations such as 14, or whether the earth formations, such as 6 and 12, do not have radial conductivity boundaries.

Figure 10:
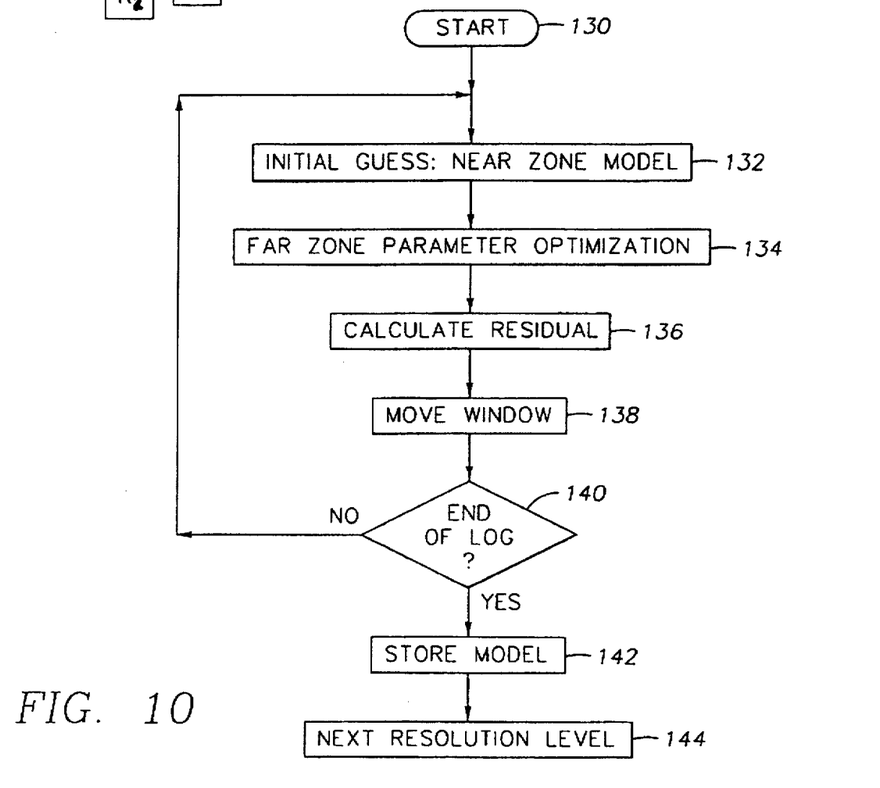
FIG. 10 is a flow chart of the process of the invention for the "far-zone".

Referring now to FIG. 10, the far zone run can be started at 130 by initializing at 132, using the axial elements from the near zone run and starting the optimization at 134 by setting the initial position of radial boundaries (such as B8 in FIG. 1) equal to those obtained in the near zone run. The step of optimization at 134 can be performed as previously explained herein. If the misfit error falls below the threshold (such as shown at 106 in FIG. 9), the residual is then calculated as shown at 136 and the windows U, C, P can be moved at 138. If the misfit error exceeds the threshold, then the radial boundaries can be moved by a predetermined increment and the optimization can be performed again at 134.

At the end of the log at 140, the final inversion model thus calculated can be stored at 142. If desired by the system operator, another near zone run can be initiated, at 144, using a smaller resolution level (minimum axial spacing between the axial elements).

The processing as described herein may be repeated until a resolution level (minimum axial spacing) desired by the system operator is achieved. Typically the resolution level may not be smaller than the axial spacing between the signal samples from the receiver coils (18A–18F in FIG. 1), which in the present invention is typically 0.25 feet. As is understood by those skilled in the art, receiver coil signal samples may be acquired and stored at smaller axial spacings than the 0.25 feet described herein, which would enable the process of the present invention to calculate earth formation models to finer resolution. As is also understood by those skilled in the art, the smallest useful resolution level can depend on the axial spacing between the transmitter coil (16 in FIG. 1) and the individual receiver coils (18A–18F in FIG. 1). Longer axial spacings typically reduce the smallest useful resolution level.

Those skilled in the art will be able to devise other embodiments of the invention disclosed herein without departing from the spirit of the invention. Therefore the invention should be limited in scope only by the claims appended hereto.

What is claimed is:

1. A method of inversion processing signals from an induction well logging instrument having a transmitter and a plurality of receivers at axially spaced apart locations, comprising:

skin effect correcting responses of said receivers by extrapolating said receiver responses to zero frequency;

generating a model of media surrounding said instrument;

adjusting conductivities of elements of said model so that a measure of misfit between said skin-effect corrected receiver responses and simulated receiver responses based on said model is minimized; and adjusting the geometry of said model so that said measure of misfit between said skin-effect corrected receiver responses and said simulated receiver responses based on said model is further minimized.

2. The method as defined in claim 1 wherein said step of adjusting conductivities comprises linear optimization.

3. The method as defined in claim 1 wherein said step of adjusting the geometry of said model comprises non-linear optimization.

4. The method as defined in claim 3 wherein said non-linear optimization comprises determining numbers of axial elements and positions of said axial elements in said model by minimizing said measure of misfit with respect said numbers and said positions of said axial elements using primarily said skin effect corrected responses from ones of said plurality of receivers closely spaced to said transmitter.

5. The method as defined in claim 4 further comprising repeating said steps of generating said model, adjusting said conductivities and adjusting said geometry, wherein a minimum selected axial spacing between said axial elements forming said geometry is reduced compared to said minimum selected axial spacing used in the prior performance of said step of generating said model.

6. The method as defined in claim 5 further comprising optimizing said geometry by selectively removing ones of said axial elements and recalculating said measure of misfit, whereby said geometry is determined to be optimal when none of said ones of said axial elements can be removed without substantially increasing said measure of misfit.

7. The method as defined in claim 1 further comprising determining numbers of radial boundaries and radial positions of said radial boundaries in said model by minimizing said measure of misfit with respect said numbers and said radial positions of said radial boundaries using said skin effect corrected receiver responses from substantially all of said receivers.

8. The method as defined in claim 1 wherein said step of skin effect correcting includes solving a system of fractional polynomial equations with respect to frequency of an alternating current energizing said transmitter.

9. The method as defined in claim 8 wherein said step of solving said system includes determining a solution to the equation:

$$\begin{bmatrix} \sigma_a(\omega_1) \\ \sigma_a(\omega_2) \\ \cdot \\ \cdot \\ \cdot \\ \sigma_a(\omega_{m-1}) \\ \sigma_a(\omega_m) \end{bmatrix} = \begin{bmatrix} 1 & \omega_1^{1/2} & \omega_1^{3/2} & \ldots & \omega_1^{n/2} \\ 1 & \omega_2^{1/2} & \omega_2^{3/2} & \ldots & \omega_2^{n/2} \\ \cdot & \cdot & \cdot & \cdots & \cdot \\ \cdot & \cdot & \cdot & \cdots & \cdot \\ \cdot & \cdot & \cdot & \cdots & \cdot \\ 1 & \omega_{m-1}^{1/2} & \omega_{m-1}^{3/2} & \ldots & \omega_{m-1}^{n/2} \\ 1 & \omega_m^{1/2} & \omega_m^{3/2} & \ldots & \omega_m^{n/2} \end{bmatrix} \begin{bmatrix} s_0 \\ s_{1/2} \\ s_{3/2} \\ \cdot \\ \cdot \\ \cdot \\ s_{n/2} \end{bmatrix}$$

$S_{2j-1} = 0, j = 1, 2, \ldots$ for the variable $S_0$.

10. The method as defined in claim 1 wherein said measure of misfit comprises a least squares norm.

11. The method as defined in claim 1 wherein said transmitter is energized with alternating current having a plurality of component frequencies.

12. The method as defined in claim 11 wherein said alternating current comprises square waves.

13. A method of determining resistivities of earth formations penetrated by a wellbore, comprising:

energizing said earth formations by passing alternating current having a plurality of frequencies through a transmitter on an instrument disposed in said wellbore;

receiving voltages induced by eddy currents flowing in said wellbore and said earth formations in receivers disposed on said instrument at spaced apart locations from said transmitter;

calculating apparent conductivities from said measured voltages;

moving said instrument through said wellbore and repeating said steps of energizing and receiving;

skin effect correcting said apparent conductivities by extrapolating said apparent conductivities to values which would occur at zero frequency;

generating a model of said earth formations surrounding said instrument;

adjusting conductivities of elements of said model so that said measure of misfit between said skin-effect corrected apparent conductivities and simulated receiver responses based on said model is minimized; and adjusting geometry of said model so that a measure of misfit between said skin-effect corrected apparent conductivities and simulated receiver responses based on said model is further minimized.

14. The method as defined in claim 13 wherein said step of adjusting geometry of said model comprises determining numbers of axial elements and positions of said axial elements in said model by minimizing said measure of misfit with respect to said numbers of and said positions of said axial elements using primarily said skin effect corrected apparent conductivities from ones of said plurality of receivers closely spaced to said transmitter.

15. The method as defined in claim 14 further comprising repeating said steps of generating said model, adjusting said conductivities and adjusting said geometry, wherein a minimum selected axial spacing between said axial elements forming said geometry is reduced compared to said minimum selected axial spacing used in the prior performance of said step of generating said model.

16. The method as defined in claim 15 further comprising optimizing said geometry by selectively removing ones of said axial elements and recalculating said measure of misfit, whereby said geometry is determined to be optimal when none of said ones of said axial elements can be removed without substantially increasing said measure of misfit.

17. The method as defined in claim 14 further comprising determining numbers of radial boundaries and radial positions of said radial boundaries in said model by minimizing said measure of misfit with respect to said numbers and said radial positions of said radial boundaries using said skin effect corrected apparent conductivities from substantially all of said receivers.

18. The method as defined in claim 13 wherein said step of skin effect correcting includes solving a system of fractional polynomial equations with respect to frequency of an alternating current energizing said transmitter.

19. The method as defined in claim 18 wherein said step of solving said system includes determining a solution to the equation:

$$\begin{bmatrix} \sigma_a(\omega_1) \\ \sigma_a(\omega_2) \\ \cdot \\ \cdot \\ \cdot \\ \sigma_a(\omega_{m-1}) \\ \sigma_a(\omega_m) \end{bmatrix} = \begin{bmatrix} 1 & \omega_1^{1/2} & \omega_1^{3/2} & \ldots & \omega_1^{n/2} \\ 1 & \omega_2^{1/2} & \omega_2^{3/2} & \ldots & \omega_2^{n/2} \\ \cdot & \cdot & \cdot & & \cdot \\ \cdot & \cdot & \cdot & & \cdot \\ \cdot & \cdot & \cdot & & \cdot \\ 1 & \omega_{m-1}^{1/2} & \omega_{m-1}^{3/2} & \ldots & \omega_{m-1}^{n/2} \\ 1 & \omega_m^{1/2} & \omega_m^{3/2} & \ldots & \omega_m^{n/2} \end{bmatrix} \begin{bmatrix} s_0 \\ s_{1/2} \\ s_{3/2} \\ \cdot \\ \cdot \\ \cdot \\ s_{n/2} \end{bmatrix}$$

$S_{2j-1} = 0, j = 1,2,\ldots$ for the variable $S_0$.

20. The method as defined in claim 13 wherein said measure of misfit comprises a least squares norm.

21. The method as defined in claim 13 wherein said transmitter is energized with alternating current having a plurality of component frequencies.

22. The method as defined in claim 21 wherein said alternating current comprises square waves.

23. A method of inversion processing signals from an induction well logging instrument having a transmitter and a plurality of receivers at axially spaced apart locations, comprising:

skin effect correcting responses of said receivers by extrapolating said receiver responses to zero frequency;

generating a model of media surrounding said instrument, said step of generating including subdividing said receiver responses into windows, a first one of said windows initially set to represent a half space, a second one of said windows including a selected number of axial elements, a third one of said windows including a single axial element;

adjusting conductivities of elements of said model so that a measure of misfit between said skin-effect corrected receiver responses and simulated receiver responses based on said model is minimized;

adjusting geometry of said model so that said measure of misfit between said skin-effect corrected receiver responses and said simulated receiver responses based on said model is minimized;

moving said windows to different ones of said receiver responses and repeating said steps of generating a model and adjusting said geometry so that said number of axial elements within said third one of said windows becomes positioned within said second one of said windows, said steps of moving, generating and adjusting repeated until a selected measurement interval is processed; and adjusting conductivities of elements of said adjusted model such that all said conductivities are non-negative.

24. The method as defined in claim 23 wherein said step of adjusting geometry of said model comprises determining numbers of axial elements and positions of said axial elements in said model by minimizing said measure of misfit with respect to said numbers of and said positions of said axial elements using primarily said skin effect corrected responses from ones of said plurality of receivers closely spaced to said transmitter.

25. The method as defined in claim 24 further comprising repeating said steps of generating said model, adjusting said geometry and adjusting said conductivities, wherein a minimum selected axial spacing between said axial elements forming said geometry is reduced compared to said minimum axial spacing used in the prior performance of said step of generating said model.

26. The method as defined in claim 24 further comprising optimizing said geometry by selectively removing ones of said axial elements and recalculating said measure of misfit, whereby said geometry is determined to be optimal when none of said ones of said axial elements can be removed without substantially increasing said measure of misfit.

27. The method as defined in claim 24 further comprising determining numbers of radial boundaries and radial positions of said radial boundaries in said model by minimizing said measure of misfit with respect to said numbers and said radial positions of said radial boundaries using said skin effect corrected receiver responses from substantially all of said receivers.

28. The method as defined in claim 23 wherein said step of skin effect correcting includes solving a system of fractional polynomial equations with respect to frequency of an alternating current energizing said transmitter.

29. The method as defined in claim 28 wherein said step of solving said system includes determining a solution to the equation:

$$\begin{bmatrix} \sigma_a(\omega_1) \\ \sigma_a(\omega_2) \\ \cdot \\ \cdot \\ \cdot \\ \sigma_a(\omega_{m-1}) \\ \sigma_a(\omega_m) \end{bmatrix} = \begin{bmatrix} 1 & \omega_1^{1/2} & \omega_1^{3/2} & \ldots & \omega_1^{n/2} \\ 1 & \omega_2^{1/2} & \omega_2^{3/2} & \ldots & \omega_2^{n/2} \\ \cdot & \cdot & \cdot & & \cdot \\ \cdot & \cdot & \cdot & & \cdot \\ \cdot & \cdot & \cdot & & \cdot \\ 1 & \omega_{m-1}^{1/2} & \omega_{m-1}^{3/2} & \ldots & \omega_{m-1}^{n/2} \\ 1 & \omega_m^{1/2} & \omega_m^{3/2} & \ldots & \omega_m^{n/2} \end{bmatrix} \begin{bmatrix} s_0 \\ s_{1/2} \\ s_{3/2} \\ \cdot \\ \cdot \\ \cdot \\ s_{n/2} \end{bmatrix}$$

$S_{2j-1} = 0, j = 1,2,\ldots$ for the variable $S_0$.

30. The method as defined in claim 23 wherein said measure of misfit comprises a least squares norm.

31. The method as defined in claim 23 wherein said transmitter is energized with alternating current having a plurality of component frequencies.

32. The method as defined in claim 31 wherein said alternating current comprises square waves.

33. The method as defined in claim 13 or 23 wherein said step of adjusting conductivities comprises linear optimization.

34. The method as defined in claims 13 or 23 wherein said step of adjusting geometry comprises non-linear optimization.

35. A method of skin effect correcting receiver signals from an induction well logging tool having a transmitter and a receiver, comprising:

determining response of said receiver at a each one of a plurality of different frequencies, said different frequencies corresponding to frequencies of alternating current energizing said transmitter;

extrapolating said response to a response which would obtain when said alternating current frequency is substantially equal to zero.

36. The method as defined in claim 35 wherein said step of extrapolating includes solving a system of fractional polynomial equations with respect to said frequency.

37. The method as defined in claim 36 wherein said step of solving said system includes determining a solution to the equation:

$$\begin{bmatrix} \sigma_a(\omega_1) \\ \sigma_a(\omega_2) \\ \cdot \\ \cdot \\ \cdot \\ \sigma_a(\omega_{m-1}) \\ \sigma_a(\omega_m) \end{bmatrix} = \begin{bmatrix} 1 & \omega_1^{1/2} & \omega_1^{3/2} & \ldots & \omega_1^{n/2} \\ 1 & \omega_2^{1/2} & \omega_2^{3/2} & \ldots & \omega_2^{n/2} \\ \cdot & \cdot & \cdot & \cdots & \cdot \\ \cdot & \cdot & \cdot & \cdots & \cdot \\ \cdot & \cdot & \cdot & \cdots & \cdot \\ 1 & \omega_{m-1}^{1/2} & \omega_{m-1}^{3/2} & \ldots & \omega_{m-1}^{n/2} \\ 1 & \omega_m^{1/2} & \omega_m^{3/2} & \ldots & \omega_m^{n/2} \end{bmatrix} \begin{bmatrix} s_0 \\ s_{1/2} \\ s_{3/2} \\ \cdot \\ \cdot \\ \cdot \\ s_{n/2} \end{bmatrix}$$

$S_{2j-1} = 0, j = 1, 2, \ldots$ for the variable $S_0$.

* * * * *